(12) United States Patent
Kastl

(10) Patent No.: US 10,405,505 B2
(45) Date of Patent: Sep. 10, 2019

(54) SYSTEM AND METHOD FOR VARIABLE RATE, HIGH SPEED IRRIGATION CONTROL

(71) Applicant: Valmont Industries, Inc., Omaha, NE (US)

(72) Inventor: John Kastl, Wahoo, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/059,214

(22) Filed: Aug. 9, 2018

(65) Prior Publication Data

US 2019/0045729 A1 Feb. 14, 2019

Related U.S. Application Data

(60) Provisional application No. 62/543,463, filed on Aug. 10, 2017.

(51) Int. Cl.
*A01G 25/09* (2006.01)
*H02P 29/10* (2016.01)
*A01G 25/16* (2006.01)

(52) U.S. Cl.
CPC .......... *A01G 25/09* (2013.01); *A01G 25/092* (2013.01); *A01G 25/16* (2013.01); *H02P 29/10* (2016.02); *H02P 2205/07* (2013.01)

(58) Field of Classification Search
CPC ...... A01G 25/09; A01G 25/16; A01G 25/092; H02P 29/10

USPC .................. 239/728, 730, 731, 732, 733, 69
See application file for complete search history.

(56) References Cited

U.S. PATENT DOCUMENTS

| | | | |
|---|---|---|---|
| 4,138,705 A * | 2/1979 | Doll ..................... | A01G 25/092 239/728 |
| 4,630,773 A | 12/1986 | Ortlip | |
| 5,911,363 A | 6/1999 | Oligschlaeger | |
| 5,955,973 A | 9/1999 | Anderson | |
| 6,007,004 A * | 12/1999 | Unruh .................. | A01G 25/092 239/69 |
| 6,431,475 B1 * | 8/2002 | Williams ............... | A01G 25/09 239/740 |
| 6,616,374 B2 | 9/2003 | Starr | |
| 6,883,726 B2 | 4/2005 | Polk et al. | |
| 7,073,735 B2 | 7/2006 | Wubben et al. | |
| 7,384,008 B1 * | 6/2008 | Malsam ............... | A01G 25/092 239/728 |
| 2004/0195408 A1 | 10/2004 | Starr | |
| 2005/0211794 A1 | 9/2005 | Clark et al. | |
| 2010/0032493 A1 * | 2/2010 | Abts .................... | A01G 25/092 239/11 |

(Continued)

*Primary Examiner* — Steven J Ganey
(74) *Attorney, Agent, or Firm* — Milligan PC LLO

(57) ABSTRACT

The present invention provides a system and method which combines sensor inputs, control systems, field mapping, motor controls, and high speed and variable speed motor designs within an irrigation machine. According to a preferred embodiment, the present invention provides systems which are capable of full torque operation, even at speeds less than the rated speed of the motor. According to further preferred embodiments, the present invention utilizes a combination of motor types including Switch Reluctance, DC Permanent Magnet and AC Permanent Magnet motors in combination with Variable Frequency Drives.

22 Claims, 3 Drawing Sheets

(56) References Cited

U.S. PATENT DOCUMENTS

2013/0018553 A1* 1/2013 Malsam ............... A01G 25/092
                                                    701/50
2015/0216108 A1   8/2015  Roth et al.
2016/0368011 A1  12/2016  Feldhaus et al.
2017/0000046 A1   1/2017  Muff
2017/0014851 A1   1/2017  Curilla
2017/0055469 A1   3/2017  Abts et al.

* cited by examiner

SYSTEM AND METHOD FOR VARIABLE RATE, HIGH SPEED IRRIGATION CONTROL

RELATED APPLICATIONS

The present application claims priority to U.S. Provisional Application No. 62/543,463 filed Aug. 10, 2017.

BACKGROUND AND FIELD OF THE PRESENT INVENTION

Field of the Present Invention

The present invention relates generally to a system and method for irrigation management and, more particularly, to a system and method for incorporating high speed, variable rate motors to manage the operational effectiveness of modern irrigation machines.

Background of the Invention

In the past, irrigation machines have utilized a number of different electric motor technologies to provide motive power to move the irrigation machine through the field. Motor types such as Brushed DC, and 3-Phase AC induction have been used. In most cases these motors were controlled with a simple on-off contactor (electro-mechanical switch) relay that was operated by either 1) a pulse width modulated signal from a control panel which was used to set the speed of the machine by operating the end or master drive unit (span tower) of the irrigation machine, or 2) from an alignment switch that was used to ensure alignment of intermediate or slave drive units to the master drive unit.

In some past products, a 3-Phase AC induction motor was coupled with a variable speed drive to provide constant movement instead of the usual start-stop movement of a traditional drive unit. There are a number of advantages to this type of system, among them: the reduction in stress on the drivetrain and associated components (i.e. gearbox gear teeth, span structures, drive unit structure, etc.); improved water uniformity; the reduction or elimination of coasting of the drive unit during the off cycle (which can lead to poor water or applicant uniformity); and reduced tire slippage. However, this type of system has several disadvantages as well including cost and complexity. However, the primary disadvantage is that the output torque of 3-Phase AC induction motors decreases as their operating speed decreases below the rated speed of the motor. This is a significant disadvantage for an irrigation machine because irrigation machines are typically required to operate at low speeds (i.e. 10-25% of full speed) during irrigation and then operate at a higher speed (i.e. 95-100% of full speed) to move the machine quickly out of the way for other farming operations or to re-position the machine for another irrigation cycle.

During irrigation, maximum torque is often needed to carry heavy, water-filled irrigation spans through a field (often on rolling terrain) and through deep wheel ruts in the field. In addition, the wheel ruts may be filled with large amounts of mud that needs to be pushed out of the way by the irrigation machine's tires. As a result, irrigation machines with a 3-Phase AC induction motor coupled to a variable-frequency drive are limited in their ability to operate at low speeds. To compensate for this, the prior art systems in some cases have used a start-stop mode of operation at low speeds (thus eliminating some of the advantages of constant movement) and have utilized oversized motors to provide sufficient torque during irrigation (resulting in increased costs).

While helpful, the prior art fails to teach or suggest any system which enables the use of high speed and variable speed motors for use with irrigation machines. In order to overcome the limitations of the prior art, a system is needed which is able to combine high speed and variable speed motors and control systems to maximize the operational effectiveness of modern irrigation machines.

SUMMARY OF THE PRESENT INVENTION

To address the shortcomings presented in the prior art, the present invention provides a system and method which combines sensor inputs, control systems, field mapping, motor controls, and high speed and variable speed motor designs within an irrigation machine. According to a further preferred embodiment, the controller of the present invention may preferably be integrated into the control system of an irrigation machine so that it may control any or all aspects of the irrigation machine to adjust and control the speed of the irrigation machine in response to sensor input (including detected machine alignment, user commanded speed, user commanded rotation etc.) and the like.

According to further preferred embodiments, the present invention provides systems which are capable of full torque operation, even at speeds less than the rated speed of the motor. According to further preferred embodiments, the present invention utilizes a combination of motor types including Switch Reluctance, and DC Permanent Magnet motors in combination with Variable Frequency Drives. As a result, motor designs of the present invention overcome the limitations of Variable Frequency Drive powered AC induction motors while providing the advantages of constant move.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
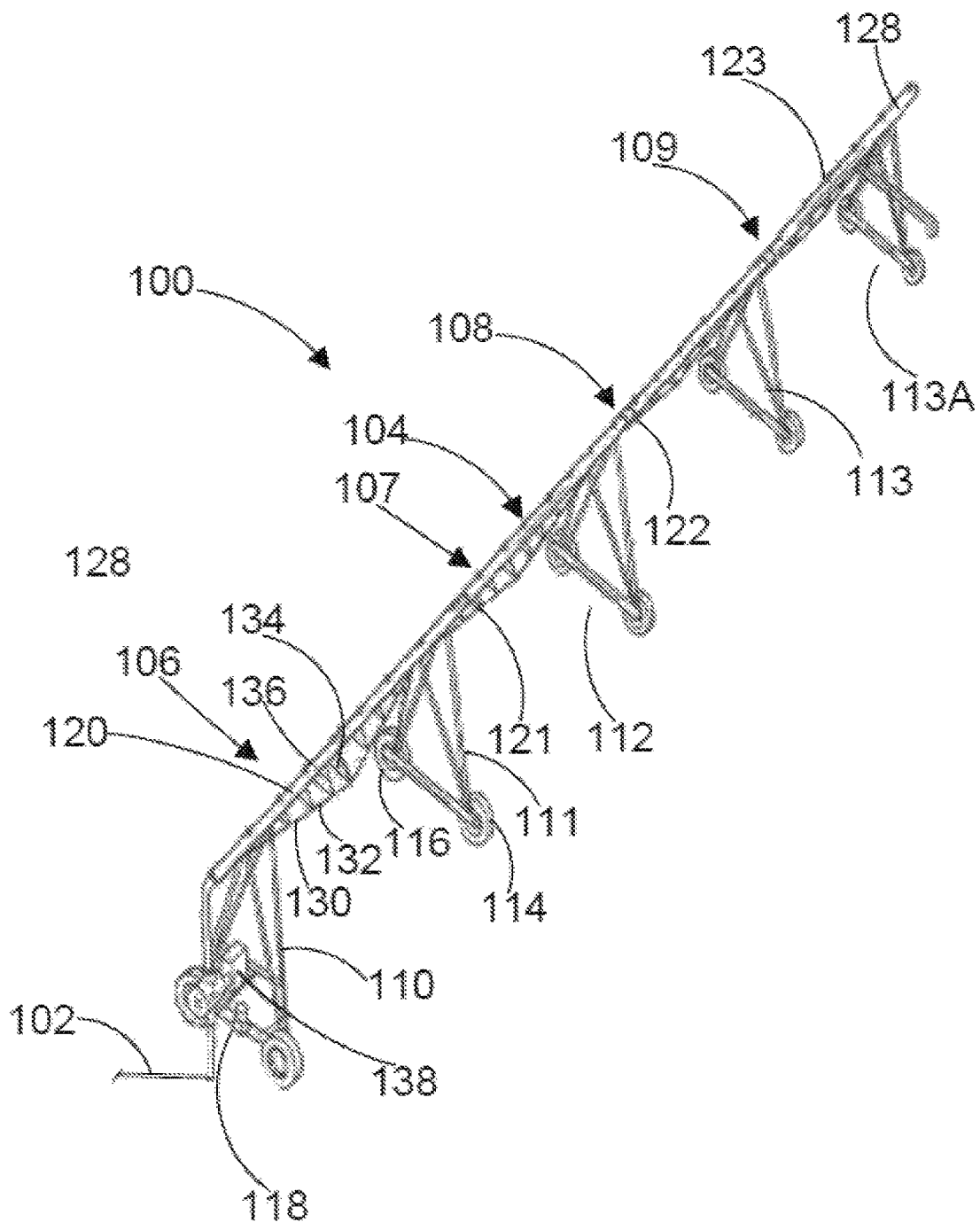
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structure), mixed analog and digital, and the like.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be illustrative and any of a variety of systems (i.e. fixed systems as well as linear and center pivot self-propelled irrigation systems; corner systems) may be used with the present invention without limitation.

As shown in FIG. 1, exemplary system 100 includes a pipeline 102 and a main section assembly 104 (irrigation section assembly) coupled (e.g., connected) to the pipeline 102. The pipeline 102 has access to a well, a water repository (e.g., water tank), or other fluid source, to furnish water to the irrigation system 100. For instance, the pipeline 102 may be pressurized to facilitate the transfer of water from the water source to main section assembly 104. The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like.

The main section assembly 104 includes a number of interconnected spans 106, 107, 108, 109 (e.g., irrigation spans) supported by one or more tower structures 110, 111, 112, 113, 113A. The tower structures 110, 111, 112, 113, 113A may be any tower configuration known in the art to adequately support the conduits (e.g., water pipe sections) described herein. It is understood that the section assembly 104 may include any number of spans and tower structures. The tower structures 110, 111, 112, 113, 113A each include wheels 114, 116, to assist in traversing the irrigation system 100 (e.g., allowing the main section assembly 104 to traverse) about a cultivation area (e.g., field). In an implementation, the wheels 114, 116 may be driven by a suitable drive unit 118 (e.g., drive motor), or the like, to assist in traversing the system 100 about the specified area. For example, the tower structure 110 may include a drive unit 118 to propel the irrigation system 100 through the cultivation area. It is understood that while only two wheels 114, 116 are shown coupled to each tower structure 110, 111, 112, 113, 113A, each tower structure 110, 111, 112, 113, 113A may include additional wheels, tracks or the like according to the design requirements of the irrigation system 100.

As shown in FIG. 1, each span 106, 107, 108, 109 includes a respective conduit 120, 121, 122, 123 (e.g., pipes) that are configured to carry (e.g., transport, provide, and so forth) liquid (e.g., applicant) along the length of the system 100 to one or more applicant dispersal assemblies that are configured to irrigate the cultivation area. Each conduit 120, 121, 122, 123 may be coupled to one another to allow fluid communication between each conduit. In an implementation, the conduits 120, 121, 122, 123 may be supported by truss-type framework structures 124, 125, 126. Thus, the main fluid displacement device may be configured to displace applicant through the conduits 120, 121, 122, 123. As further shown in FIG. 1, the irrigation system 100 also includes a cantilevered boom structure 128 that extends outwardly from the end tower structure 112. As additionally shown, multiple truss rods 130 are tensioned between the tower structures 110, 111, 112. In implementations, the truss rods 130 include truss rod segments 132 (i.e., shaft components) extending longitudinally between the truss-type framework structures 124, 125, 126. The truss rod segments 132 may be arranged end-to-end and separated using spreaders 134 suspended from the respective span 106, 107, 108, 109. For example, the spreaders 134 may be suspended from the respective span 106, 107, 108, 109 using, for example, diagonals 136.

Figure 2:
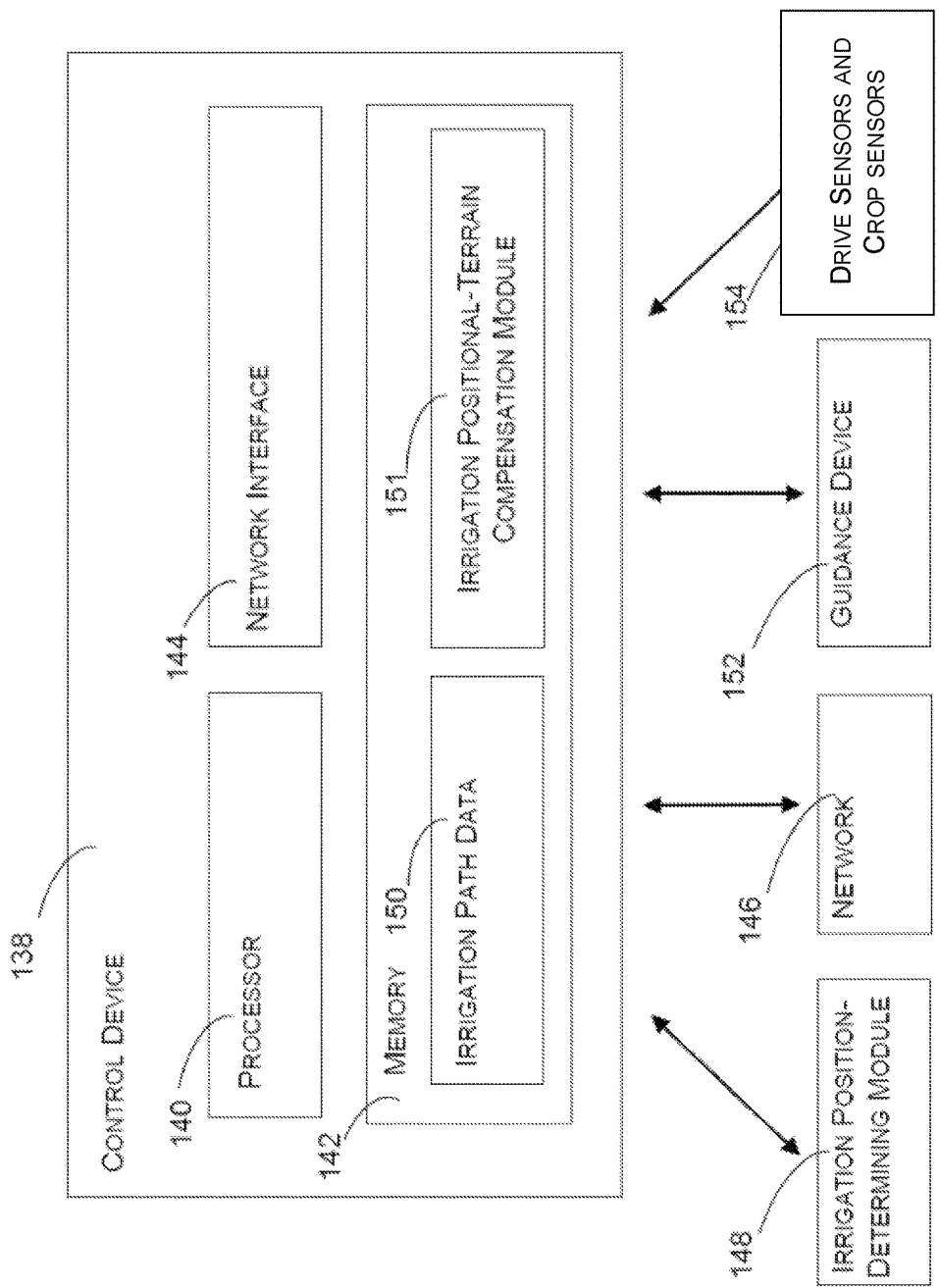
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, a module 151 and a network interface 144. The processor 140 provides processing functionality for the control device 138 and may include any number of processors, micro-controllers, or other processing systems. The processor 140 may execute one or more software programs that implement techniques described herein. The memory 142 is an example of tangible computer-readable media that provides storage functionality to store various data associated with the operation of the server 102 (client device 104), such as the software program and code segments mentioned above, or other data to instruct the processor 140 and other elements of the control device 138 to perform the steps described herein. The memory 142 may include, for example, removable and non-removable memory elements such as RAM, ROM, Flash (e.g., SD Card, mini-SD card, micro-SD Card), magnetic, optical, USB memory devices, and so forth. The network interface 144 provides functionality to enable the control device 138 to communicate with one or more networks 146 through a variety of components such as wireless access points, transceivers and so forth, and any associated software employed by these components (e.g., drivers, configuration software, and so on).

In implementations, the irrigation position-determining module 148 may include a global positioning system (GPS) receiver or the like to calculate a location of the irrigation system 100. Further, the control device 138 may be coupled to a guidance device or similar system 152 of the irrigation system 100 (e.g., steering assembly or steering mechanism) to control movement of the irrigation system 100. As shown, the control device 138 may further include a positional-terrain compensation module 151 to assist in controlling the movement and locational awareness of the system. Further, the control device 138 may preferably further include multiple inputs and outputs to receive data from sensors 154 and monitoring devices as discussed further below.

According to a preferred embodiment of the present invention, the processor 140 of the present invention may preferably receive data such as field mapping data, water pressure and weather data which may preferably include wind speed, wind direction, humidity and barometric pressure from the sensor systems as discussed further below. Further, the processor may receive and access irrigation path data 150 which may further include water application rates, machine speed and motor operations data. Preferably, the system of the present invention may preferably operate to provide the processor with continual updates of all sensor, operations and speed data so that it may dynamically calculate and update the target motor speed in real-time as the irrigation system executes a given watering plan. Further in accordance with aspects of the present invention, the processor 140 may preferably be programmed to receive: irrigation map data (i.e. GPS dimensions of a given field); weather data (including humidity, temperature, wind speed and direction); movement data (including speed and direction of the irrigation machine); and topographical data (including data regarding the slope of the terrain to be irrigated); as well as safety zones, guidance tower speed, max ET ratio, minimum Arc Radius, full or partial circle, max/min trajectories, start/end angles and the like.

According to a further preferred embodiment, the drive sensors 154 may preferably include an analog, non-contact alignment sensor (or the like) which may provide an alignment signal to a controller which in turn controls and/or adjusts the speed of the motor. According to a further preferred embodiment, the motor of the present invention may preferably be a variable speed motor which is capable of rotational speeds up to and/or greater than 3600 RPM. According to a further preferred embodiment, the motor for use with the present invention may preferably be any motor capable of supplying torque at partial speeds equal to or greater than the rated torque at full speed for use on an irrigation system. For example, the preferred motor may be a SR motor or a DC motor (such as a permanent magnet DC motor) or the like as discussed further below. According to a still further preferred embodiment, the drive system of the present invention may preferably further include a 52:1 helical center drive gearbox and a 52:1 worm wheel gearbox. Alternatively, other configurations may also be used including: a 40:1 helical center-drive gearbox and a 50:1 worm wheel gearbox, or a 20:1 worm drive gearbox and a 52:1 worm wheel gearbox.

According to a further preferred embodiment, the present invention may achieve additional speed by reducing the reduction ratio of the center drive or wheel gearboxes. In accordance with a further preferred embodiment, additional speed may further be gained by increasing the rotational speed of the motor. According to further preferred embodiments, an AC induction motor with a variable frequency drive reading a proportional input signal, a standard micro switch-contactor-start/stop motor with smaller reduction gearboxes, larger diameter tires and/or a combination thereof may further be preferably used.

According to a further alternative preferred embodiment, the motor of the present invention may preferably be DC motor. According to a further preferred alternative embodiment invention, the motor of the present invention may preferably be a switched reluctance motor (SRM).

According to a preferred embodiment, an irrigation machine in accordance with the present invention may preferably achieve and maintain ground speeds in excess of 27 ft./min. According to further preferred embodiments, irrigation machines in accordance with the present invention may further preferably achieve and maintain ground speeds in the range of 27-36 ft./min. According to still further preferred embodiments, irrigation machines in accordance with the present invention may further preferably achieve and maintain ground speeds in excess of 36 ft/min.

Figure 3:
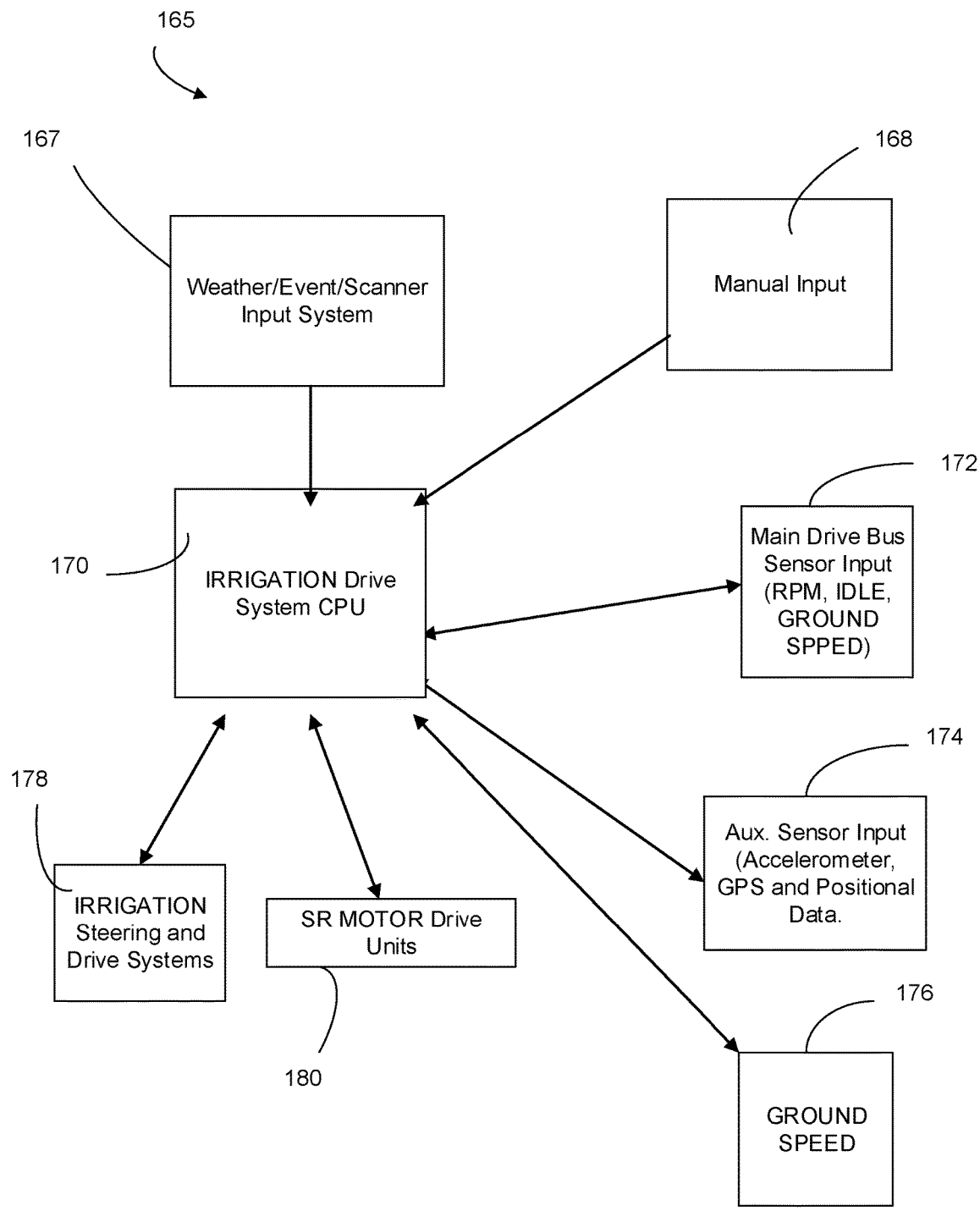
FIG. 3 shows a block diagram in accordance with further preferred embodiment of the present invention.

With reference now to FIG. 3, an exemplary system 165 incorporating aspects of the present invention shall now be further discussed. As further shown, an exemplary irrigation system may include an irrigation drive system CPU 170. It should be understood that the functions of the irrigation drive system CPU 170 as discussed below may preferably incorporate some or all of the functions and operations of control device 138 discussed above with respect to FIG. 2. Alternatively, elements and functions of the control device 138 and CPU 170 may be distributed between multiple processing elements within a single location or distributed further to one or more separate control panels or remote processing elements (i.e. servers, networked systems and the like).

As further shown in FIG. 3, the irrigation drive CPU 170 preferably receives one or more drive data inputs which the drive CPU 170 preferably processes and analyses to create control instructions for the irrigation steering/drive systems 178 and the individual drive units (i.e. SR motors) 180. As shown in FIG. 3, the drive data inputs to the system may preferably include: input from drive bus 172 which may preferably include machine related drive data such as RPM, commanded speed, stop, wheel position, and the like. The input data may preferably further include input from auxiliary sensors 174 which preferably may include inputs such as: GPS location data, accelerometer data, vehicle orientation/position data and the like. Further, the input data preferably may further include ground speed data 176. Further, the input data may also include manual inputs 168 to direct the system. Additionally, the system may preferably further include environmental sensor inputs 167 which may preferably provide the drive CPU 170 with a variety of data which may include for example: data regarding irrigation map data (i.e. dimensions of a given field); weather data (including humidity, temperature, wind speed and direction); and topographical data (including data regarding the slope of the terrain to be irrigated). Preferably, received data from all sources may preferably be processed to define and optimize the speed and the variable rate operational state of each individual drive unit 180 of the irrigation system 165.

In accordance with preferred aspects of the present invention, an irrigation machine incorporating the present invention may preferably manage the variable speed of a given irrigation system 165 and allow for high ground speeds to be properly used and controlled. The result of this configuration is an expansion of the application rates and a reduction in the overall operating time and overall energy consumed in an irrigation cycle.

While the above descriptions regarding the present invention contain much specificity, these should not be construed as limitations on the scope, but rather as examples. Many other variations are possible. For example, the processing elements of the present invention by the present invention may operate on a number of frequencies. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A control system for use with a mechanized irrigation system, wherein the mechanized irrigation system comprises a plurality of conduits which are flexibly connected at a plurality of connection points; wherein the alignment of each of the plurality of conduits is independently adjustable; wherein the mechanized irrigation system further comprises a plurality of drive towers attached to the plurality of connection points; wherein the control system comprises:
    a first drive motor, wherein the first drive motor is attached to a first drive tower; wherein the first drive tower is connected to a first connection point; wherein the first connection point flexibly attaches a first conduit and a second conduit;
    a second drive motor, wherein the second drive motor is attached to a second drive tower; wherein the second drive tower is connected to a second connection point; wherein the second connection point flexibly attaches the second conduit and a third conduit;
    wherein the first motor is capable of producing a ground speed for the first drive tower in excess of 27 ft./min;
    wherein the second drive motor is capable of producing a ground speed for the second drive tower in excess of 27 ft./min;
    a first motor control system, wherein the first motor control system receives inputs and instructions and adjusts the operational status of the first drive motor;
    a second motor control system, wherein the second motor control system receives inputs and instructions and adjusts the operational status of the second drive motor;
    wherein the first and second motor control systems are configured to vary a drive motor characteristic in response to a drive command; wherein the drive motor characteristic is selected from the group of drive motor characteristics comprising: electrical pulse rate, voltage, RPM, current and frequency;
    wherein the drive command comprises a commanded speed of the irrigation machine;
    a motor command system, wherein the motor command system determines a target drive motor status and outputs a drive command to each drive motor to achieve the target drive motor status; wherein the motor command system determines the target drive motor status based on detected input condition data;
    wherein the detected input condition data comprises alignment sensor data; wherein the alignment sensor data comprises data indicating the alignment between the first conduit and the second conduit; wherein the alignment sensor data further comprises data indicating the alignment between the second conduit and the third conduit;
    wherein the detected input condition data comprises detected input condition data selected from the group of detected input data comprising: wind speed, cloud cover, sunlight intensity, and wind direction.

2. The system of claim 1, wherein the system further comprises a first processing system; further wherein the first processing system receives first drive motor data and determines a desired first drive motor status from the received first drive motor data; further wherein the first motor control system receives input and instructions from the first processing system.

3. The system of claim 2, wherein the first processing system receives at least one input from a group of inputs comprising: commanded irrigation machine speed, motor speed, operator commands, GPS position, ground speed and agronomic sensor data.

4. The system of claim 3, wherein the first drive motor data comprises data indicating the RPM of the drive motor.

5. The system of claim 2, wherein the adjustments to the operational status of the first drive motor comprise changes to the RPM rate of the first drive motor.

6. The system of claim 2, wherein the inputs to the first motor control system comprise the commanded speed of the irrigation machine.

7. The system of claim 6, wherein the first motor control system receives a variable input signal to continuously adjust the speed of an end tower.

8. The system of claim 2, wherein the detected input condition data comprises slope of the terrain being irrigated.

9. The system of claim 8, wherein the detected input condition data comprises max/min trajectories and minimum Arc Radius.

10. The system of claim 1, wherein an alignment sensor provides an alignment signal to the first motor control system.

11. The system of claim 10, wherein the alignment signal causes the first motor control system to adjust the RPM rate of the first motor.

12. The system of claim 11, wherein the first motor control system receives a variable input signal to continuously adjust the speed of the first motor.

13. The system of claim 12, wherein the variable input signal is triggered by a sensor that measures the relative alignment between two spans.

14. The system of claim 13, wherein the alignment between the two spans is maintained in a substantially straight alignment.

15. The system of claim 13, wherein the sensor is a non-contact sensor.

16. The system of claim 15, wherein the sensor is a potentiometer-type sensor.

17. The system of claim 1, wherein the first drive motor is a motor capable of providing full-speed torque at speeds lower than the rated speed of the motor.

18. The system of claim 17, wherein the detected input condition data comprises wind speed and wind direction.

19. The system of claim 17, wherein the detected input condition data comprises cloud cover.

20. The system of claim 17, detected input condition data comprises sunlight intensity.

21. The system of claim 1, wherein the first and second drive motors are capable of an RPM rate that will produce a ground speed of an irrigation system tower structure in excess of 36 ft./min.

22. A control system for use with a mechanized irrigation system, wherein the mechanized irrigation system comprises a plurality of conduits which are flexibly connected at a plurality of connection points; wherein the alignment of each of the plurality of conduits is independently adjustable; wherein the mechanized irrigation system further comprises a plurality of drive towers attached to the plurality of connection points; wherein the control system comprises:

- a first drive motor, wherein the first drive motor is attached to a first drive tower; wherein the first drive tower is connected to a first connection point; wherein the first connection point flexibly attaches a first conduit and a second conduit;
- a second drive motor, wherein the second drive motor is attached to a second drive tower; wherein the second drive tower is connected to a second connection point; wherein the second connection point flexibly attaches the second conduit and a third conduit;
- wherein the first motor is capable of producing a ground speed for the first drive tower in excess of 27 ft./min;
- wherein the second drive motor is capable of producing a ground speed for the second drive tower in excess of 27 ft./min;
- a first motor control system, wherein the first motor control system receives inputs and instructions and adjusts the operational status of the first drive motor;
- a second motor control system, wherein the second motor control system receives inputs and instructions and adjusts the operational status of the second drive motor;
- wherein the first and second motor control systems are configured to vary a drive motor characteristic in response to a drive command; wherein the drive motor characteristic is selected from the group of drive motor characteristics comprising: electrical pulse rate, voltage, RPM, current and frequency;
- wherein the drive command comprises a commanded speed of the irrigation machine;
- a motor command system, wherein the motor command system determines a target drive motor status and outputs a drive command to each drive motor to achieve the target drive motor status; wherein the motor command system determines the target drive motor status based on detected input condition data;
- wherein the detected input condition data comprises alignment sensor data; wherein the alignment sensor data comprises data indicating the alignment between the first conduit and the second conduit; wherein the alignment sensor data further comprises data indicating the alignment between the second conduit and the third conduit;
- wherein the detected input condition data comprises detected input condition data selected from the group of detected input data comprising: wind speed, cloud cover, sunlight intensity, and wind direction.

* * * * *